Oct. 19, 1926.  
R. G. PILKINGTON  
CLUTCH  
Filed Oct. 17, 1923  
1,603,798
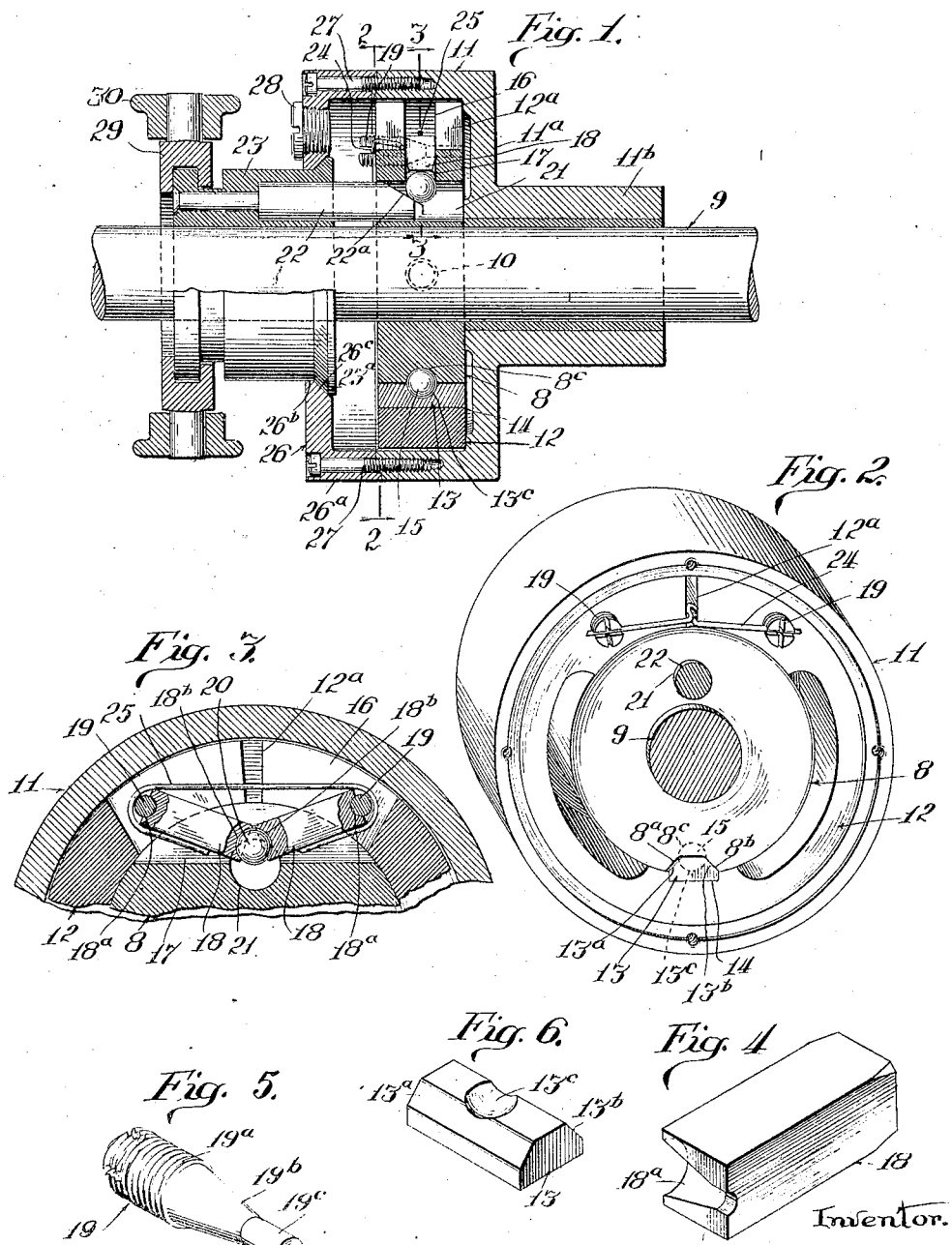

Patented Oct. 19, 1926.

1,603,798

UNITED STATES PATENT OFFICE.

ROBERT G. PILKINGTON, OF CHICAGO, ILLINOIS, ASSIGNOR TO WESTERN ENGINEERING AND MANUFACTURING COMPANY, OF CHICAGO, ILLINOIS, A CORPORATION OF ILLINOIS.

CLUTCH.

Application filed October 17, 1923. Serial No. 668,974.

My invention relates to an improvement in clutches, and more particularly to clutches of the type known as internal expanding clutches in which a split expansible band is maintained in a floating position between an outer member which is to be driven and a driving member upon which the band is loosely supported and to which it is non-rotatably fastened.

One of the objects of my invention is the provision of a clutch of simple, strong, durable and compact construction which will be reliable and efficient in operation and require a minimum of attention on the part of the operator.

A more specific object of my invention is the provision of novel means for expanding the respective ends of the split band against the member to be driven; and, to this end, my invention preferably contemplates the provision of a circumferentially extending slot in the respective ends of the split band and a similarly extending slot in the driving member which communicates with the first-named slot in which slots are disposed a pair of toggle arms arranged divergently with respect to the axis of said driving member and band, the outer ends of said arms engaging the respective ends of the split band while the inner ends of said arms are preferably provided with concaved seats in which a ball is disposed thus providing a pivotal connection between the inner ends of the arms, in combination with a longitudinally slidable wedge adapted to engage the ball thereby operating the toggle and expanding the band.

A further object of my invention is the provision of novel adjustable means for compensating for any lost motion that may develop between the toggle arms at their outer ends and the respective ends of the split band or between the toggle arms at their inner ends and the ball therebetween.

A further object of my invention is the provision of novel means for connecting the expansible band and the driving member so that they rotate together, said means preferably being so arranged that, upon the respective ends of the split band being expanded against the member to be driven, the medial portion of the band will be wedged against the member to be driven, thereby insuring an effective binding action between the entire outer surface of the expansible band and the member to be driven.

A further object of my invention is the provision of novel housing means for the working parts of the clutch in combination with novel means for throwing the clutch in and out which are of such construction that a substantially oil-tight housing is provided for the working parts, particularly when the clutch is non-operative or running idle.

The invention consists in the novel constructions, arrangements and devices to be hereinafter described and claimed for carrying out the above-stated objects and such other objects as will appear in the following description of a certain preferred embodiment illustrated in the accompanying drawings, wherein—

Fig. 1 is a longitudinal sectional view of a clutch embodying the principles of my invention;

Fig. 2 is a perspective view of the right end of the clutch looking along the line 2—2 of Fig. 1;

Fig. 3 is a sectional view, on an enlarged scale, taken on the line 3—3 of Fig. 1;

Fig. 4 is a perspective view of one of the toggle arms;

Fig. 5 is a perspective view of one of the adjusting screws against which the outer ends of the toggle arms engage; and Fig. 6 is a perspective view of the key preferably employed for connecting the driving member and the expansible band so that they rotate together.

Like characters of reference designate like parts in the several views.

Referring now to the drawings, the driving member 8 of the clutch is fixed to a shaft 9 by any suitable means, for example, a set screw 10. The member to be driven includes a rim portion 11 which surrounds the driving member 8 and which is connected by a web portion 11ª to a hub portion 11ᵇ, the latter being journaled on the shaft 9. An expansible band 12 is interposed between the driving member 8 and the rim 11, said band being split at 12ª.

The means for connecting the driving member and the expansible band so that they will rotate together, in the embodiment herein illustrated, includes a longitudinally extending key 13 which is disposed in a seat 14 provided in the band 12, said seat being disposed in the medial portion of said band and on the inner side thereof. The sides of the key 13 are provided with oppositely inclined bearing surfaces 13ª and 13ᵇ which are engaged by similarly inclined surfaces 8ª and 8ᵇ, respectively, provided on the driving member 8. Co-operating recesses 13ᶜ and 8ᶜ may be provided in the key 13 and the driving member 8, respectively, for the insertion of a ball 15 to retain the key in its proper position.

The means for expanding the respective ends of the split band 12 is preferably disposed in a circumferentially extending slot 16 formed in the respective ends of the band and a similarly extending slot 17 formed in the driving member 8, said slot 17 being substantially co-extensive and registering with the slot 16. A pair of toggle arms 18 are disposed partly in the slot 16 and partly in the slot 17, said arms being arranged divergently with respect to the axes of the driving member and the band. The respective ends of the split band are provided with adjusting screws 19, each screw having a threaded portion 19ª which extends through a suitably internally threaded aperture formed in one side of the band, a conical bearing surface 19ᵇ which extends across the slot 16 and a terminal portion 19ᶜ which extends into a suitable recess provided in the other side of the band. The outer ends of the respective toggle arms are provided with conical seats 18ª which are adapted to bear against the conical bearing surfaces 19ᵇ of the adjusting screws. The inner ends of the respective toggle arms are provided with concaved seats 18ᵇ which bear against a ball 20 thus affording a pivotal connection between the inner ends of the arms. The driving member 8 is provided with a longitudinally extending opening 21 which communicates with the slot 17, and which is adapted to receive a longitudinally slidable member 22 carried by a sleeve 23 slidable on the shaft 9. The inner end of the member 22 is provided with an inclined surface 22ª upon which the ball 20 rolls when the member 22 is moved inwardly. The heads of the screws 19 are slotted for the reception of the respective extremities of a spring 24, the medial portion of said spring preferably being doubled and passed between the ends of the split band, thus holding the spring in place and preventing relative movement of the screws. The toggle arms 18 may be held in operative relation by a spring 25, see Fig. 3, the extremities of said spring being bent around the outer ends of the respective toggle arms and bearing against the under sides thereof. It will be understood that the spring 25 is so formed that its extremities normally tend to lie quite close to the medial portion of the spring. The spring 25 is particularly useful when the clutch is taken apart or the member 22 completely withdrawn.

It will be observed that the web portion 11ª of the member to be driven forms closure means for one side of the clutch mechanism. The other side of the mechanism is enclosed by a cover member 26 provided with a flange 26ª which fits tightly against the adjacent edge of the rim 11, the cover member being secured to the rim by a plurality of screws 27. The cover member 26 is provided with a central aperture 26ᵇ so that the member 23 may slide freely on the shaft. The member 23 on its inner end is provided with a flange 23ª, the outer side of said flange being tapered to fit tightly against a tapered seat 26ᶜ formed on the cover member 26. Oil may be introduced into the housing through an aperture in the cover member 26 which is normally closed by a screw plug 28. The sleeve 23 may be moved on the shaft 9 by any desired means, for example, by a collar 29 fitted on the sleeve and connected to a fork 30, the latter being mounted on a suitable handle (not shown).

When the parts are in the position shown in Figs. 1, 2 and 3, the band 12 is in its contracted position and the clutch mechanism is inoperative. Movement of the sleeve 23 inwardly carries with it the member 22 and the ball 20 rolls up the inclined surface 22ª which forces the inner ends of the toggle arms 18 outwardly, consequently, the respective ends of the split band 12 are forced apart and into binding engagement with the inner side of the rim 11. If the shaft 9 and the driving member 8 be rotating clockwise, the inclined surface 8ᵇ of the driving member will tend to climb the inclined surface 13ᵇ of the key 13, but, if the driving member and shaft be rotating counter-clockwise, the inclined surface 8ª of the driving member will tend to climb the inclined surface 13ª of the key 13. In either case, the medial portion of the split band will be wedged into binding engagement with the inner side of the rim 11. By the expanding and key arrangements aforesaid the entire outer surface of the band 12 is uniformly brought into effective binding engagement with the inner surface of the rim 11 and the grip of the band on the rim is firm and secure. The key is of such construction that, while the wedging action is certain and secure, there is no opportunity for the parts to stick or jam when the member 22 is withdrawn and the clutch released. The toggle arms and the ball 20 float with the band and the driving member 8. The arms cannot be thrown out of proper relation. They readily position themselves when the band is expanding or contracting or when either or both of the screws 19 are adjusted. Adjustment of one screw more than the other is of no consequence. Since the arms are partly in the slot 16 and partly in the slot 17, relative endwise movement of the band and the driving member 8 is effectively prevented. The toggle arms 18 are very light in weight as compared with the other parts of the clutch so that the tendency of the arms to expand the band 12, due to centrifugal action when the clutch is running idle, is practically negligible.

When the clutch is operative and the parts are rotating, the oil in the housing flows outwardly due to centrifugal action. There is no tendency for oil to escape around the sleeve 23 under such conditions. When the clutch is running idle and the sleeve 23 is in its outermost position, the opening in the cover member 26 around the sleeve 23 is effectively closed by the flange 23ª.

While the members 8 and 11 have been referred to herein as the driving and driven members, respectively, it will be understood that this condition may be readily reversed. For example, power may be applied directly to the member 11, in which case the member 11 would become the driving member of the clutch and the member 8 the driven member thereof, such a reversal of conditions being common practice in this art.

The parts of the clutch are few in number and the construction is compact, strong, and durable. The clutch is reliable and efficient in operation and requires very little or no attention on the part of the operator.

I do not intend to limit my invention to the details of construction shown and described, except only in so far as certain of the appended claims are specifically so limited, as it will be obvious that modifications may be made without departing from the principles of my invention.

I claim:

1. In a clutch, the combination of a rotatable member, a second rotatable member surrounding said first-named member, a split band interposed between said members, means connecting said band and first-named member so that they rotate together, a pair of arms arranged divergently with respect to the axes of said members and having their outer ends engaging the respective ends of said split band, said arms at their inner ends being provided with concaved seats, a ball in said seats thereby forming a pivotal connection between the inner ends of said arms, and means for thrusting said ball outwardly, for the purpose specified.

2. In a clutch, the combination of a rotatable member, a second rotatable member surrounding said first-named member, a split band interposed between said members, means connecting said band and first-named member so that they rotate together, a pair of arms arranged divergently with respect to the axes of said members and having their outer ends engaging the respective ends of said split band, said arms at their inner ends being provided with concaved seats, a ball in said seats thereby forming a pivotal connection between the inner ends of said arms, and a longitudinally movable wedge adapted to engage said ball and thrust it outwardly, for the purpose specified.

3. In a clutch, the combination of a rotatable member, a second rotatable member surrounding said first-named member, a split band interposed between said members, means connecting said band and first-named member so that they rotate together and so that the medial portion of said band is forced radially with respect to said first-named member when driving power is applied, the respective ends of said split band being provided with a circumferentially extending slot, said first-named member being formed with a circumferentially extending slot communicating with said first-named slot, a pair of toggle arms in said slots and having their outer ends engaging the respective ends of said split band, and means adapted to thrust said arms into a straight line, for the purpose specified.

4. In a clutch, the combination of a rotatable member, a second rotatable member surrounding said first-named member, a split band interposed between said members, means connecting said band and first-named member so that they rotate together, the respective ends of said split band being provided with a circumferentially extending slot, said first-named member being formed with a circumferentially extending slot communicating with said first-named slot, a pair of arms in said slots and arranged divergently with respect to the axes of said members and having their outer ends engaging the respective ends of said split band, said arms at their inner ends being provided with concaved seats, a ball in said seats thereby forming a pivotal connection between the inner ends of said arms, and means for thrusting said ball outwardly, for the purpose specified.

5. In a clutch, the combination of a rotatable member, a second rotatable member surrounding said first-named member, a split band interposed between said members, means connecting said band and first-named member so that they rotate together, the respective ends of said split band being provided with a circumferentially extending slot, said first-named member being formed with a circumferentially extending slot communicating with said first-named slot, a pair of arms in said slots and arranged divergently with respect to the axes of said members and having their outer ends engaging the respective ends of said split band, said arms at their inner ends being provided with concaved seats, a ball in said seats thereby forming a pivotal connection between the inner ends of said arms, and a longitudinally movable wedge adapted to engage said ball and thrust it outwardly, for the purpose specified.

6. In a clutch, the combination of a rotatable member, a second rotatable member surrounding said first-named member, a split band interposed between said members, means connecting said band and first-named member so that they rotate together, the respective ends of said split band being provided with a circumferentially extending slot, said first-named member being formed with a circumferentially extending slot communicating with said first-named slot, a pair of arms in said slots and arranged divergently with respect to the axes of said members, means carried by the respective ends of said split band for engaging the outer ends of said respective arms, one of said means being adjustable, an element providing a pivotal connection between the inner ends of said arms, and means for thrusting said element outwardly, for the purpose specified.

7. In a clutch, the combination of a rotatable member, a second rotatable member surrounding said first-named member, a split band interposed between said members, means connecting said band and first-named member so that they rotate together, the respective ends of said split band being provided with a circumferentially extending slot, said first-named member being formed with a circumferentially extending slot communicating with said first-named slot, a pair of arms in said slots and arranged divergently with respect to the axes of said members, the outer ends of said respective arms having conical seats, adjusting screws carried by the respective ends of said split band and having conical surfaces adapted to engage said conical seats, an element providing a pivotal connection between the inner ends of said arms, and means for thrusting said element outwardly, for the purpose specified.

8. In a clutch, the combination of a rotatable member, a second rotatable member surrounding said first-named member, a split band interposed between said members, means connecting said band and first-named member so that they rotate together, the respective ends of said split band being provided with a circumferentially extending slot, said first-named member being formed with a circumferentially extending slot communicating with said first-named slot, a pair of arms in said slots and arranged divergently with respect to the axes of said members, the outer ends of said respective arms having conical seats, adjusting screws carried by the respective ends of said split band and having conical surfaces adapted to engage said conical seats, means to prevent relative rotational movement of said screws after being adjusted, an element providing a pivotal connection between the inner ends of said arms, and means for thrusting said element outwardly, for the purpose specified.

9. In a clutch, the combination of a rotatable member, a second rotatable member surrounding said first-named member, a split band interposed between said members, means connecting said band and first-named member so that they rotate together, the respective ends of said split band being provided with a circumferentially extending slot, said first-named member being formed with a circumferentially extending slot communicating with said first-named slot, a pair of arms in said slots and arranged divergently with respect to the axes of said members and having their outer ends engaging the respective ends of said split band, said arms at their inner ends being provided with concaved seats, a ball in said seats thereby forming a pivotal connection between the inner ends of said arms, means for normally retaining said arms in operative relation, and means for thrusting said ball outwardly, for the purpose specified.

10. In a clutch, the combination of a pair of co-axial relatively rotatable members, means interposed therebetween to afford a releasable driving connection between said members, a pair of toggle links for expanding said means, an operating member slidably mounted adjacent the inner ends of the toggle links and an intermediate member interposed between said links and affording a roller engagement with the adjacent ends of the toggle links and with said slidable operating member.

11. In a clutch, the combination of a pair of co-axial relatively rotatable members, means interposed between said members and adapted to be expanded to afford a driving connection between said members, a pair of disconnected toggle links divergently arranged and having the outer ends connected with the aforesaid means for expanding the latter, an operating member for the toggle links slidably mounted adjacent the inner ends of the toggle links, and an anti-friction member interposed between the inner ends of said links and having a bearing engagement therewith and with said operating member.

12. In a clutch, the combination of a rotatable member, a rotatable element surrounding said member, a split band member interposed between said first-named member and element, the respective ends of said band member being provided with a circumferentially extending slot, said first-named member being formed with a circumferentially extending slot communicating with said first-named slot, a pair of arms in said slots and having their outer ends engaging the respective ends of said split band member, means tending to thrust said arms into a straight line thereby forcing the respective ends of said band member against said element, one of said members carrying longitudinally extending means disposed substantially opposite the ends of said band member, the sides of said last-named means having oppositely inclined bearing surfaces, and the other of said members being provided with surfaces adapted to engage said respective first-named surfaces whereby relative rotational movement of said members forces the medial portion of said band member against said element.

13. In a clutch, the combination of a rotatable member, a rotatable element surrounding said member, a split band member interposed between said first-named member and element, the respective ends of said band member being provided with a circumferentially extending slot, said first-named member being formed with a circumferentially extending slot communicating with said first-named slot, a pair of arms in said slots and arranged divergently with respect to the axes of said members and having their outer ends engaging the respective ends of said split band member, said arms at their inner ends being provided with concaved seats, a ball in said seats thereby forming a pivotal connection between the inner ends of said arms, and means for thrusting said ball outwardly thereby forcing the respective ends of said band member against said element, one of said members carrying longitudinally extending means disposed substantially opposite the ends of said band member, the sides of said last-named means having oppositely inclined bearing surfaces, and the other of said members being provided with surfaces adapted to engage said respective first-named surfaces whereby relative rotational movement of said members forces the medial portion of said band member against said element.

14. In a clutch, the combination of a shaft, a rotatable member fixed to said shaft, a second rotatable member journaled on said shaft and having a rim surrounding said first-named member, a split band interposed between said first-named member and said rim, means connecting said band and first-named member so that they rotate together, toggle means for forcing the respective ends of said band against said rim, a sleeve slidable on said shaft for operating said toggle means, a cover member surrounding said sleeve and adapted to be secured to the open side of said rim, said sleeve having an outturned annular flange and the cover having a seat which receives said flange.

15. In a clutch, the combination of a pair of co-axial relatively rotatable members, a split band interposed therebetween, a pair of toggle links operable to spread apart the ends of the split band and thereby frictionally interlock the aforesaid rotatable members, and a bearing member for one end of one of the toggle links having a wedge engagement therewith and adjustable to compensate for wear in the toggle link mechanism.

ROBERT G. PILKINGTON.

Certificate of Correction.

It is hereby certified that in Letters Patent No. 1,603,798, granted October 19, 1926, upon the application of Robert G. Pilkington, of Chicago, Illinois, for an improvement in "Clutches," an error appears in the printed specification requiring correction as follows: Page 5, line 67, claim 14, after the word "flange" and before the period insert the words *when said sleeve is in its outermost position;* and that the said Letters Patent should be read with this correction therein that the same may conform to the record of the case in the Patent Office.

Signed and sealed this 16th day of November, A. D. 1926.

[SEAL.]
M. J. MOORE,
*Acting Commissioner of Patents.*